United States Patent
Mayser (10) Patent No.: US 10,460,181 B2
(45) Date of Patent: Oct. 29, 2019

(54) PROCESSING OF SENSOR DATA FOR A DRIVER ASSISTANCE SYSTEM

(71) Applicant: Bayerische Motoren Werke Aktiengesellschaft, Munich (DE)

(72) Inventor: Christoph Mayser, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 266 days.

(21) Appl. No.: 15/669,215

(22) Filed: Aug. 4, 2017

(65) Prior Publication Data

US 2017/0372150 A1  Dec. 28, 2017

Related U.S. Application Data

(63) Continuation of application No. PCT/EP2016/052498, filed on Feb. 5, 2016.

(30) Foreign Application Priority Data

Feb. 6, 2015  (DE) .................. 10 2015 202 099

(51) Int. Cl.
*G06K 9/00* (2006.01)
*B60W 30/095* (2012.01)
(Continued)

(52) U.S. Cl.
CPC ..... *G06K 9/00805* (2013.01); *B60W 30/0956* (2013.01); *B60W 50/06* (2013.01);
(Continued)

(58) Field of Classification Search
CPC .......... G06K 9/00805; G06K 9/00798; G06K 9/628; G06K 2209/21; G06T 7/11;
(Continued)

(56) References Cited

U.S. PATENT DOCUMENTS 8,457,359 B2  6/2013  Strauss et al.
2006/0190147 A1* 8/2006 Lee .................... B62D 15/0275
701/26
(Continued)

FOREIGN PATENT DOCUMENTS

DE  10 2009 009 211 A1  9/2009
DE  10 2009 044 284 A1  4/2010
(Continued)

OTHER PUBLICATIONS

PCT/EP2016/052498, International Search Report dated Jul. 15, 2016 (Two (2) pages).
(Continued)

*Primary Examiner* — Carol Wang
(74) *Attorney, Agent, or Firm* — Crowell & Moring LLP (57) ABSTRACT

In order to process sensor data for a driver assistance system oriented towards the driver's comfort, sensor data that is sensed by a sensor device and describes objects is preprocessed such that a distinction is made between a driving zone and a non-driving zone, where the driving zone is designated as an object driving zone. The object driving zone is delimited by a boundary line. Since the sensor data is processed for a comfort-oriented driver assistance system, it does not have to describe the entire theoretical driving zone. Rather, the boundary line is used to delimit the driving zone within which the vehicle can normally be expected to drive. Based thereon, it is easy to determine an appropriate boundary line and significantly reduce the volume of data to be transmitted from the sensor device to a central control device of the comfort-oriented driver assistance system in order to describe the sensed objects.

17 Claims, 5 Drawing Sheets

(51) Int. Cl.
   *G08G 1/16* (2006.01)
   *G06T 7/11* (2017.01)
   *G06T 7/13* (2017.01)
   *B60W 50/06* (2006.01)
   *G06K 9/62* (2006.01)

(52) U.S. Cl.
   CPC ............ *G06K 9/00798* (2013.01); *G06T 7/11* (2017.01); *G06T 7/13* (2017.01); *G08G 1/165* (2013.01); *B60W 2050/065* (2013.01); *B60W 2520/10* (2013.01); *B60W 2540/18* (2013.01); *B60W 2550/10* (2013.01); *B60W 2710/207* (2013.01); *G06K 9/628* (2013.01); *G06K 2209/21* (2013.01); *G06T 2207/30241* (2013.01); *G06T 2207/30256* (2013.01); *G06T 2207/30261* (2013.01); *G08G 1/167* (2013.01)

(58) Field of Classification Search
   CPC ............ G06T 7/13; G06T 2207/30241; G06T 2207/30261; G06T 2207/30256; G08G 1/165; G08G 1/167; B60W 2710/207; B60W 2550/10; B60W 2540/18; B60W 2520/10; B60W 2050/065; B60W 50/06; B60W 30/0956
   See application file for complete search history.

(56) References Cited

U.S. PATENT DOCUMENTS

| | | |
|---|---|---|
| 2011/0022317 A1 | 1/2011 | Okita |
| 2011/0137486 A1 | 6/2011 | Lim et al. |
| 2013/0218448 A1 | 8/2013 | Suzuki |
| 2015/0039212 A1* | 2/2015 | Kido .................. G08G 1/09623 701/117 |
| 2016/0171893 A1* | 6/2016 | Chen ..................... G08G 1/167 701/300 |
| 2016/0231130 A1* | 8/2016 | Akiyama .............. B60W 30/09 |
| 2016/0257304 A1* | 9/2016 | Lavoie .................. B60W 30/06 |
| 2017/0236422 A1* | 8/2017 | Naka ..................... B60W 30/09 701/301 |

FOREIGN PATENT DOCUMENTS

| | | |
|---|---|---|
| DE | 10 2009 050 503 A1 | 11/2010 |
| DE | 10 2010 032 063 A1 | 5/2011 |
| EP | 2 765 047 A1 | 8/2014 |

OTHER PUBLICATIONS

German Search Report issued in German counterpart application No. 10 2015 202 099.1 dated Dec. 3, 2015, with Statement of Relevancy (Eight (8) pages).

\* cited by examiner

PROCESSING OF SENSOR DATA FOR A DRIVER ASSISTANCE SYSTEM

CROSS REFERENCE TO RELATED APPLICATIONS

This application is a continuation of PCT International Application No. PCT/EP2016/052498, filed Feb. 5, 2016, which claims priority under 35 U.S.C. § 119 from German Patent Application No. 10 2015 202 099.1, filed Feb. 6, 2015, the entire disclosures of which are herein expressly incorporated by reference.

BACKGROUND AND SUMMARY OF THE INVENTION

The present invention relates to a method for processing sensor data for a driver assistance system and to a sensor apparatus.

There are different driver assistance systems which assist the driver of a motor vehicle with partially automated or fully automated control of the motor vehicle. Such driver assistance systems are lane change assistants, braking assistants, emergency steer assistants or driver assistance systems for automated driving of a motor vehicle.

So that driver assistance systems can be used to control a vehicle and, in particular, can control the vehicle, automatic methods have been developed and can be used to detect objects and to enter them in an occupancy grid. The individual objects are often detected using different sensors, for example a radar, a lidar, a camera or an infrared sensor.

The data from the different sensors are combined to form the occupancy grid in a central control device.

The occupancy grid must be created in real time so that the driver assistance system can create collision-free trajectories.

Since a plurality of objects are respectively detected by the different sensor apparatuses at the same time, large volumes of data arise and must be transmitted from the sensor apparatuses to the central control device. A significant portion of the computing power of the central control device is used to communicate with the individual sensor apparatuses.

The driver assistance systems for motor vehicles can be subdivided into two groups: the safety driver assistance systems and the comfort driver assistance systems.

The safety driver assistance systems assist the driver in a hazardous situation. Such safety driver assistance systems are, for example, the anti-lock braking system (ABS) and automatic driving stability systems. There are also safety driver assistance systems which take into account data relating to automatically detected objects, for example emergency braking assistants which detect objects by means of a radar and trigger emergency braking in a hazardous situation. The advantage of such safety driver assistance systems is that they can react considerably more quickly than a person and can also detect the driving situation without interruption. Persons can sometimes be distracted, which is often the trigger for hazardous situations. The aim of safety driver assistance systems is to prevent an accident or at least to minimize the consequences of an accident.

In contrast, comfort driver assistance systems are intended to assist the driver when driving and to simplify the driving of a vehicle. A typical example of a comfort driver assistance system is an automatic adaptive cruise control system. In a similar manner to that in the case of the emergency braking assistant, an object in front of the respective vehicle is detected using a radar and the distance to this object is determined. Depending on the detected distance and the current driving speed, the brakes and the drive are controlled in such a manner that a predetermined distance is complied with. This system can be used to follow another vehicle without having to accelerate or brake. The driving of a vehicle is therefore simplified.

The invention is based on the object of providing a method for processing sensor data for a driver assistance system for a motor vehicle and of providing a sensor apparatus, with which method and sensor apparatus the sensor data are efficiently transmitted between sensor apparatuses and a central control device and little computing power is used in the central control unit.

In a method according to the invention for processing sensor data for a comfort driver assistance system for a motor vehicle, sensor data describing the respective location of objects are acquired. The coordinates of the objects are extracted from the sensor data, an inner side of the object, on which the motor vehicle is intended to drive past the object, being defined. The current speed of the motor vehicle is recorded. A region which can be traveled on and is in front of and/or behind each of the objects in the direction of travel of the motor vehicle is distinguished from a region which cannot be traveled on. The region which can be traveled on is referred to as the object travel region below. The boundary between the object travel region and the region which cannot be traveled on is a boundary line which extends beyond the object to the front and/or to the rear along the inner side of the object in the direction of travel. Data relating to this boundary line are forwarded from a sensor device to a control device of the comfort driver assistance system instead of the sensor data describing the object.

The object travel region is therefore defined by the boundary line. The volume of data to be transmitted between the sensor device and the control device can be considerably reduced by transmitting a boundary line for the object travel region instead of an exact description of the detected objects.

In a comfort driver assistance system which processes information relating to automatically detected objects, the detection and processing must be carried out in real time and secure transmission of all necessary data from the sensor devices to the control device must be ensured. The object travel region excludes the region which cannot be traveled on, with the result that objects which are in this region which cannot be traveled on any longer appear and do not produce any further data. The description of the object travel region by means of the boundary line gives rise to considerably fewer data items than the description of individual objects by means of coordinates, which is why the data relating to the boundary lines can be transmitted between the sensor apparatus and a central control device more efficiently and with less computational effort.

The invention is based on the knowledge that comfort driver assistance systems which process information relating to automatically detected objects in the environment of the vehicle in order to automatically control the vehicle, in particular in order to automatically steer the vehicle, do not require an exact description of the detected objects, but only a reliable description of the region which can be traveled on. For example, it is not necessary to individually describe individual roadside posts, but rather it suffices to determine a boundary line, which extends along the inner side of a plurality of roadside posts, instead of the individual geometric description of the roadside posts. In principle, it is possible to leave a road between two roadside posts, which can also make sense in an emergency in order to swerve into a meadow adjacent to the road in a hazardous situation, for example. However, this is not useful for comfort-oriented control since normally there is no desire to leave the road with a vehicle in the normal driving mode. In other words, this means that a comfort driver assistance system does not require an exact description of the entire region which can be theoretically traveled on, but rather only a reliable description of the region which can be usefully traveled on. This region which can be traveled on may be smaller than the entire region which can be theoretically traveled on. It goes without saying that it must not contain any obstacles. A comfort driver assistance system differs in this respect from a safety driver assistance system which requires information relating to the entire region which can be theoretically traveled on. If a safety driver assistance system detects an obstacle on the regular road, it also requires information regarding whether it is possible to swerve onto a meadow adjoining the road in order to be able to initiate a swerving operation.

The boundary line can therefore be determined in different ways as long as it is ensured that the object travel region comprises a large part of the region which can be traveled on during normal operation.

The boundary line can be determined, for example, by connecting the inner sides of adjacent objects. In this case, the boundary line may connect the objects in a straight line. The boundary line may also be curved. It may be represented by a spline function in the regions between the objects, for example, which spline function connects those edges of the adjacent objects which are on the inner sides to one another. The connection of the inner sides of a plurality of objects to form a boundary line is preferably carried out in the sensor apparatus.

The boundary line may also be a trajectory which describes a path of the motor vehicle which, coming from the outside in front of the object in the direction of travel, leads past the inside of the object at a minimum distance with a maximum steering angle, and/or describes a path which leads outward from the object with a maximum steering angle for the current driving speed after the object, the maximum steering angle being determined on the basis of the speed of the motor vehicle.

The boundary line is preferably determined only if the vehicle is moving at a predetermined minimum speed. This minimum speed is, for example, 10 km/h and is, in particular, 30 km/h. At high speeds, new objects are detected at short intervals of time since the motor vehicle is moving, with the result that the volume of data describing the detected objects is greater at high speeds than at low speeds. If trajectories are intended to be automatically calculated in order to autonomously steer the motor vehicle, they are usually calculated in sections for a particular section in front of the motor vehicle. They must be recalculated at shorter intervals at a high speed since they are covered more quickly. This means that, the higher the speed, the more difficult it is to detect the objects in real time and to transmit the corresponding data to the central control device and to process said data there.

The inner side of the objects is preferably determined as that side of the objects on which a trajectory which describes the movement of the motor vehicle in the direction of travel passes along. For this purpose, the trajectory is stipulated in the direction of travel of the motor vehicle starting from the current location of the motor vehicle. The trajectory may be rectilinear or may be formed according to the course of a route defined by means of a navigation system.

Automatic object recognition is preferably carried out, each of the detected objects respectively being at least assigned to a class of a predetermined set of classes of objects, for example road boundary posts, a road sign and another vehicle. In Germany, the road boundary posts usually have a white reflector and have an orange reflector at intersections. There is preferably a class for boundary posts which are not arranged at intersections (white reflectors) and boundary posts which are arranged at intersections (orange reflectors). If the boundary line is determined by connecting adjacent objects, a boundary post for an intersection represents an end region of such a boundary line since a further road joins between two boundary posts for an intersection, onto which road it is possible to turn off.

The object recognition is preferably carried out by means of an image analysis.

Moving objects can be detected by means of a speed measurement for measuring the relative speed between the motor vehicle and the object.

It is also possible to distinguish between moving and non-moving objects by means of such a speed measurement.

Moving objects, for example other motor vehicles and cyclists and pedestrians, are preferably not taken into account as obstacles which restrict the region which can be traveled on when determining the region which can be traveled on. In particular, other motor vehicles generally travel on a region which can be traveled on, with the result that they indicate to the system where the region which can be traveled on is situated. Therefore, it may also be expedient to take into account moving objects when determining the inner side of static objects.

A vehicle travel region can be determined, the boundaries of which are defined by two trajectories each describing a theoretical path of the motor vehicle running to the right or left in the direction of travel from the current location of the motor vehicle with a maximum steering angle. The vehicle travel region is between these two trajectories, in which case objects and an object travel region outside this vehicle travel region can be ignored.

The vehicle travel region is preferably calculated in the central control device and is combined with the object travel regions to form a movement region.

The calculated vehicle travel region can also be transmitted from the central control device to the sensor apparatus or can be calculated in the sensor apparatus itself. The sensor apparatus can then determine, with the aid of the determined vehicle travel region, whether particular objects are outside the vehicle travel region. These objects can then be ignored during further processing and only the descriptions of the objects inside the vehicle travel region are transmitted to the central control device.

The currently measured driving speed can be used as the speed of the motor vehicle for determining the maximum steering angle. Alternatively, it is possible to use the currently measured driving speed minus a maximum deceleration.

The width of the motor vehicle is preferably taken into account when determining the trajectories. This can be effected, on the one hand, by virtue of the fact that the trajectories for the vehicle travel region begin on the lateral edge of the motor vehicle and the trajectories of the object travel region describe the movement of the corresponding lateral edge region of the motor vehicle. On the other hand, the trajectories may describe the movement of a center point of a motor vehicle. A center point is, for example, the center of gravity of the motor vehicle or the center of a base of the motor vehicle. The trajectories which describe the object travel regions should then be accordingly offset by half a width from the edge of the corresponding objects in the direction of the vehicle.

A sensor apparatus according to the invention comprises a sensor element and a processor controller for processing sensor data for a comfort driver assistance system for a motor vehicle. The sensor element is designed to acquire sensor data describing a respective location of objects. The processor controller is designed to extract coordinates of the objects from the sensor data, an inner side of the object, on which the motor vehicle is intended to drive past the object, being determined. The processor controller is designed in such a manner that a region which can be traveled on and is in front of and/or behind each of objects in the direction of travel of the motor vehicle is distinguished from a region which cannot be traveled on. The region which can be traveled on is referred to as the object travel region below. The boundary between the object travel region and the region which cannot be traveled on is defined by a boundary line which extends beyond the object to the front and/or to the rear along the inner side of the object in the direction of travel. Data relating to this boundary line are provided, instead of the sensor data describing the object, for forwarding to the comfort driver assistance system.

Such a sensor apparatus is already used to process the sensor data acquired by the sensor elements to such an extent that their volume of data is considerably reduced in comparison with a conventional description of objects, with the result that fast and simple transmission to a central control device of the comfort driver assistance system as possible.

The sensor elements may be in the form of a radar, a lidar, a camera, and/or an ultrasonic sensor, for example.

A radar has a wide range and, in addition to location information, also provides speed information relating to the individual objects. However, the angular resolution of a radar is rather low. A lidar, which is also referred to as a laser scanner, has a very high resolution. However, the sensor signals are impaired in the case of poor visibility caused by fog or spray on the road. A camera has a high angular resolution, but the exact distance can be estimated only with a considerable amount of computational effort. The method of operation of a camera is considerably impaired in the case of backlighting. An ultrasonic sensor is used for the near field detection of objects. The individual sensor types each have strengths and weaknesses, with the result that the objects in the environment of the motor vehicle are preferably detected using different sensor types.

The term "sensor element" may also comprise any data source which provides data for describing objects. Such a data source may also be a digital map in which the objects are entered.

The sensor data from the sensor apparatus are intended to be acquired and forwarded as precisely as possible. When processing the sensor data in the sensor apparatus, there is therefore no intention to add a safety range or safety tolerance. This can then be carried out in the driver assistance system.

A system according to the invention for processing sensor data for a driver assistance system for a motor vehicle comprises at least one sensor apparatus according to the invention and a central control device which is connected to the sensor apparatus.

The central control device may be designed to create an occupancy grid. The occupancy grid can be used to automatically determine a trajectory for autonomously steering the motor vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is explained by way of example below using the drawings, in which.

DETAILED DESCRIPTION OF THE DRAWINGS

Figure 5:
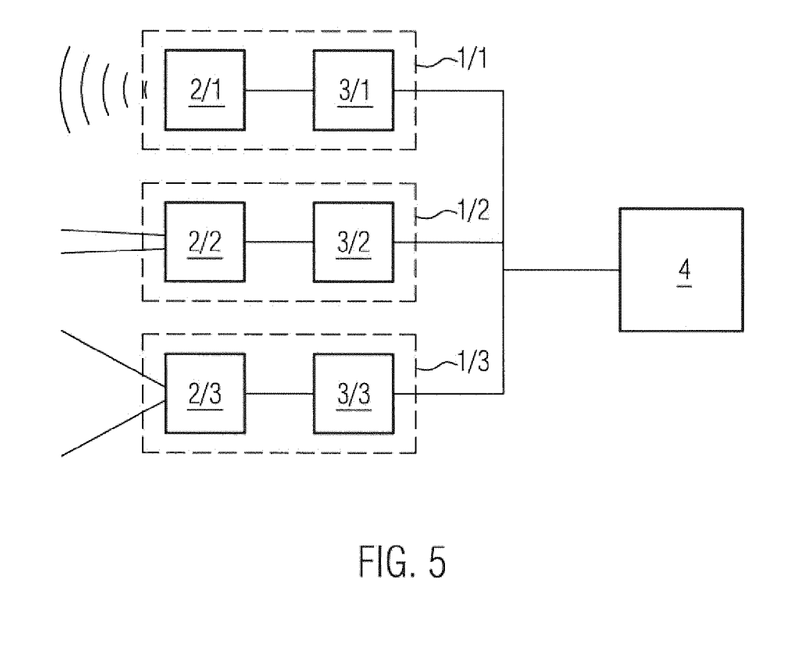

A sensor apparatus 1/1, 1/2 and 1/3 according to the invention respectively has a sensor element 2/1, 2/2 and 2/3 (FIG. 5). The sensor apparatuses 1/1-1/3 are each provided with a processor controller 3/1-3/3.

In the present exemplary embodiment, three sensor apparatuses (n=1; 2; 3) are provided and are arranged in a motor vehicle. The first sensor apparatus 1/1 has a radar as a sensor element 2/1, the second sensor apparatus 1/2 has a lidar 2/2, which is also referred to as a laser scanner, and the third sensor apparatus 1/3 has a camera 2/3. The sensor elements 2/n are each connected to one of the processor controllers 3/n. The processor controllers 3/n preprocess the sensor signals output by the sensor elements 2/n.

The processor controllers 3/n are connected to a central control device 4 to which they forward the preprocessed sensor signals. The sensor signals from the different sensor apparatuses 1/n are combined in the central control device to form an occupancy grid.

Figure 3:
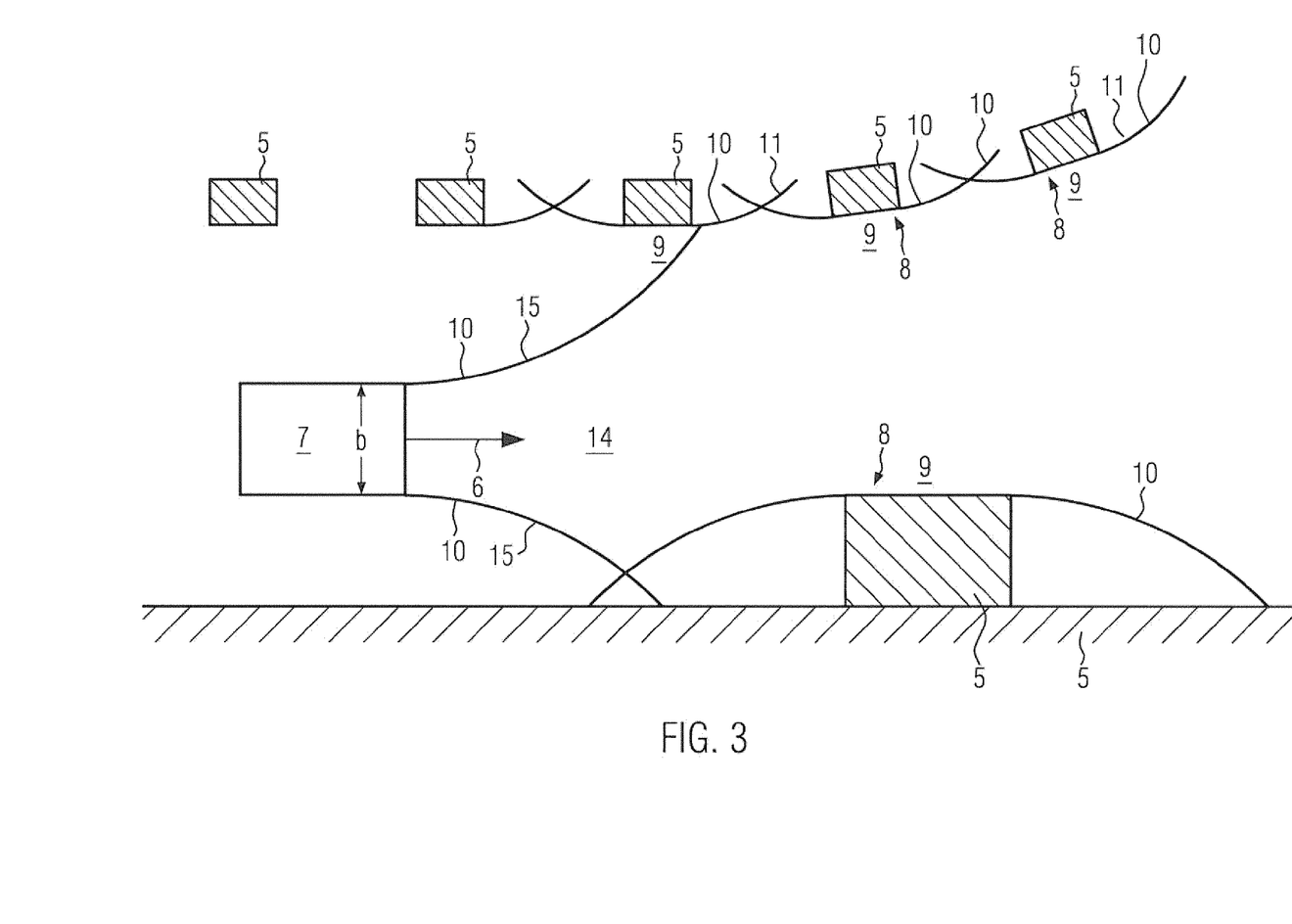
FIG. 3 schematically shows a plan view of a route with a motor vehicle and the object travel region and the vehicle travel region, FIG. 4 schematically shows a plan view of a route with a motor vehicle and the object travel region and the vehicle travel region, and FIG. 5 schematically shows a block diagram of sensor apparatuses and a control device.
Figure 4:
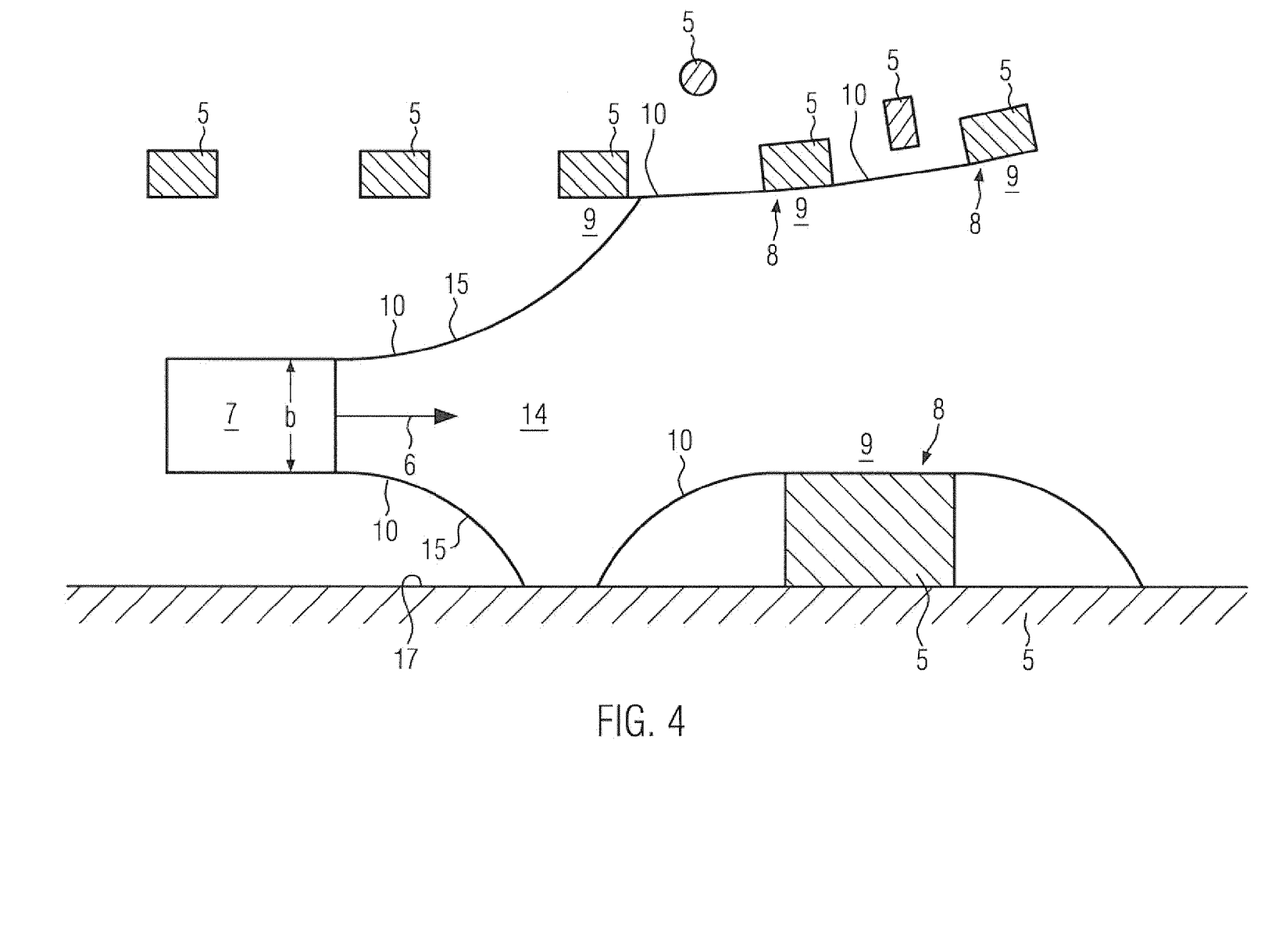

The sensor elements 2/n are used to capture the coordinates of objects 5 along a route in front of a vehicle 7 in the direction of travel 6 (FIGS. 3-4).

The vehicle 7 moves at a predetermined speed which is measured by a corresponding sensor (not illustrated) and is transmitted to the processor controllers 3/n via the central control device 4.

The present invention is based on the knowledge that static objects 5 are usually arranged beside the region of a road which can be traveled on and the edge of a road can usually be represented by a rectilinear curve or a curve having slight curvature, with the result that the representation of a multiplicity of static objects can be replaced with a boundary line between the region which can be traveled on and the static objects. This boundary line can already be produced in one of the sensor apparatuses 1/n and can be forwarded to the central control device 4 instead of a detailed description of the individual objects 5.

Figure 1:
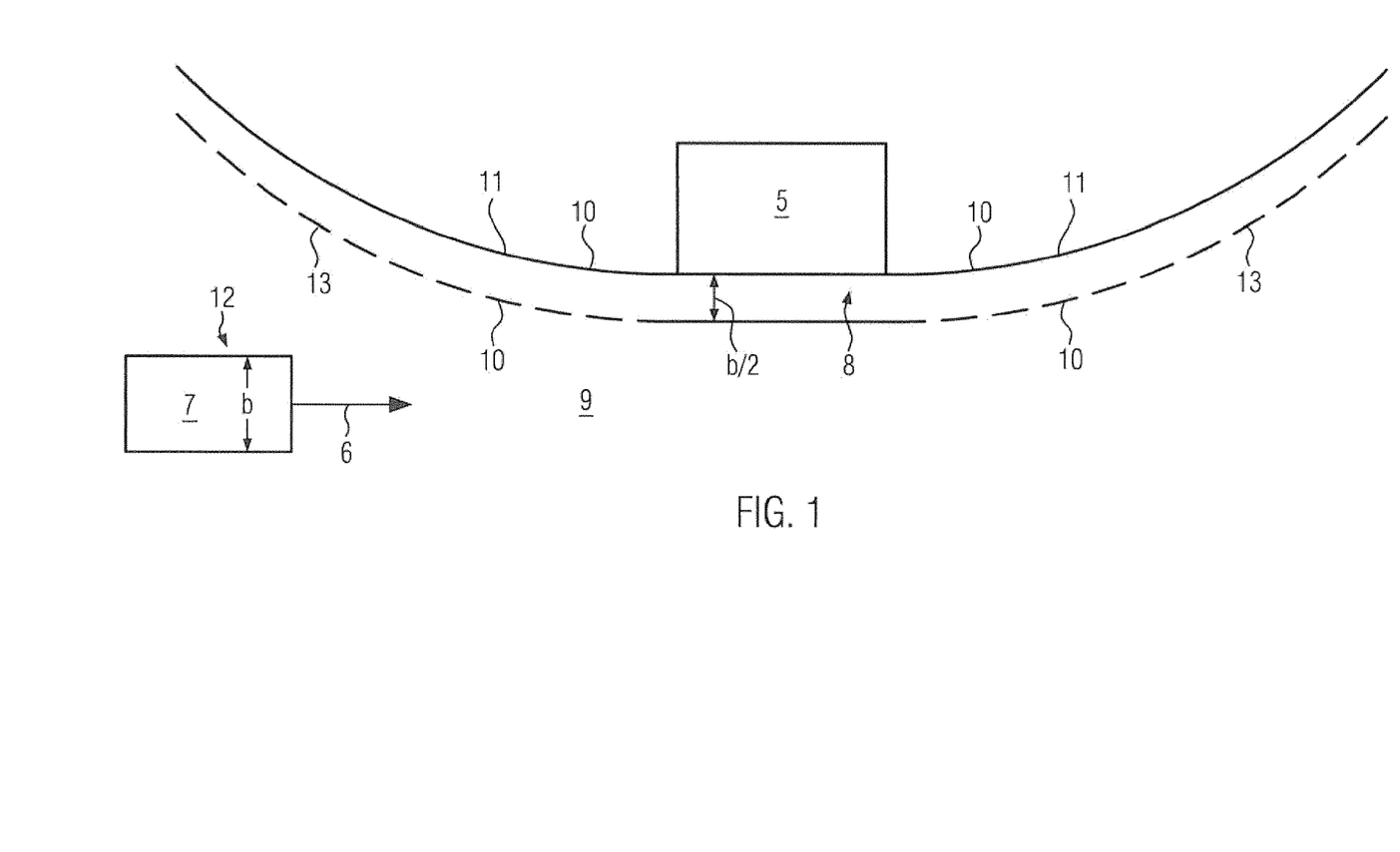
FIG. 1 shows a motor vehicle and an object and an object travel region.

If the desire is to pass the object 5 on a particular side, which is referred to as the inner side or travel region side 8 below, a region which can be traveled on, which is referred to as the object travel region below, and a region which cannot be traveled on are then distinguished, the boundary line 10 between the object travel region 9 and the region which cannot be traveled on being a trajectory 11, for example, which describes a theoretical path of the motor vehicle 7 which, coming from the outside in front of the object 5 in the direction of travel, leads past the inside of the object 5 at a minimum distance with a maximum steering angle, and/or describes a theoretical path which leads outward from the object 5 with a maximum steering angle for the current driving speed after the object in the direction of travel (FIG. 1). The maximum steering angle is determined on the basis of the recorded speed of the motor vehicle 7.

FIG. 1 shows such an object 5 having the trajectory 11, the maximum steering angle of which is determined according to the current driving speed of the motor vehicle 7. In this case, the same driving speed is assumed for the entire trajectory 11, with the result that the steering angle is constant and the trajectory 11 respectively has a constant curvature or the same radius in the region in front of the object 5 in the direction of travel 6 and in the region after the object 5 in the direction of travel 6. These two sections of the trajectory 11 are therefore circle segments. The shape of the trajectory is adapted to the shape of the object 5, which is rectilinear in this case, only along the object 5. The object 5 may itself have a curved shape. If the curvature of the object is less than the curvature of the trajectory 11 produced by the maximum steering angle, the trajectory 11 is adapted to the shape of the object, otherwise the trajectory 11 passes along the edge on the inner side of the object 5 at a short distance at that point of the object 5 which projects inward to the maximum extent into the region which can be traveled on.

In an alternative embodiment, the current driving speed can also be used to determine the maximum steering angle, but it is taken into account that a deceleration of the motor vehicle is possible, the driving speed being decelerated in the direction of travel 6 with the maximum possible deceleration rate. The slower the driving speed, the greater the maximum steering angle. This means that the curvature of the trajectory increases in the direction of travel.

The trajectory 11 describes the movement of a lateral edge 12 of the motor vehicle 7 facing the object 5. The motor vehicle 7 must pass the object 5 with this edge 12. For simple post-processing, the trajectory 11 can be transferred inward by half a width b of the motor vehicle 7, with the result that the resulting trajectory 13 describes the movement of a center point of the motor vehicle 7 which leads past the inner side 8 of the object 5 without touching it. A center point of the motor vehicle 7 is, for example, the center of gravity of the motor vehicle 7 or a center of a base of the motor vehicle 7. As a result, the movement of the motor vehicle in the object travel region can be considered to be a movement of a punctiform body provided that the movement in the edge region of the object travel region is tangential to the trajectory 13 bounding the object travel region.

The trajectories 11, 13 may be represented by functions which can be described very easily in mathematical terms. However, curves, the curvature of which changes over the course, can also be easily described. This is possible, for example, by means of spline functions. The sections along the edge of the object 5 can also be easily concomitantly taken into account hereby. Such a representation in the form of a function describing the boundary line 10 of the object travel region makes it possible to represent the latter using few parameters and therefore with a small volume of data which can be very quickly transmitted from the sensor apparatus 1 to the central control device 4.

Figure 2:
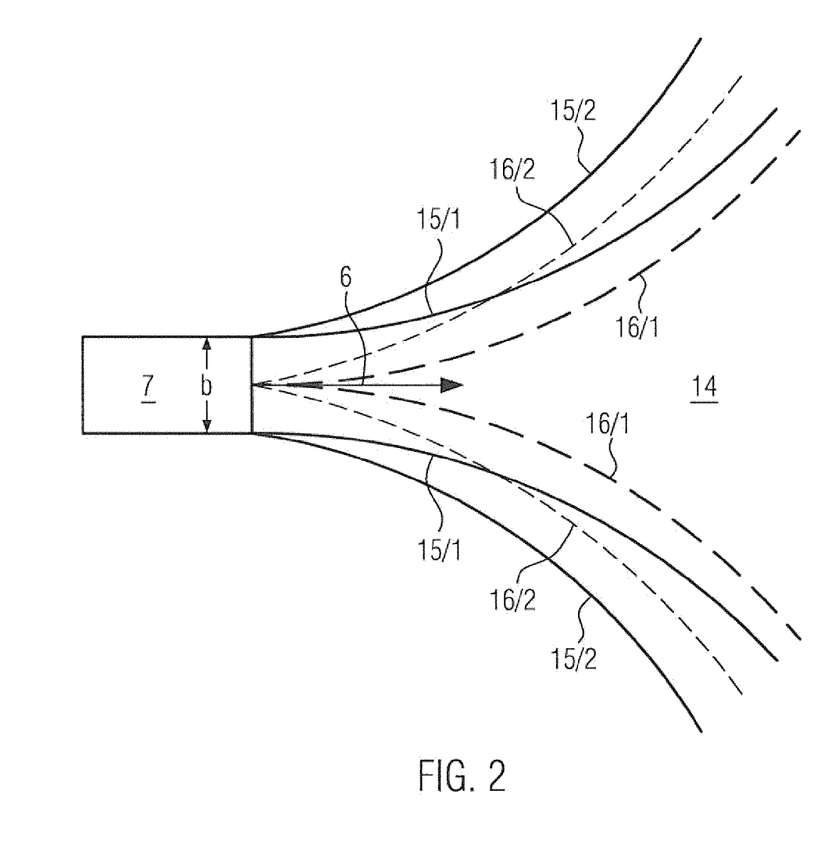
FIG. 2 shows a motor vehicle and a vehicle travel region.

Furthermore, it is possible on the basis of the current location of the motor vehicle and the current direction of travel of the motor vehicle which are determined using the sensor apparatuses 1 with respect to the objects 5 arranged at the front in front of the motor vehicle 7 in the direction of travel 6. A region which can be traveled on is distinguished from a region which cannot be traveled on based on the current location and the current direction of travel of the motor vehicle and on the basis of the driving speed, this region which can be traveled on being referred to as a vehicle travel region 14 (FIG. 2). The vehicle travel region 14 is bounded by two boundary lines or trajectories 15 each describing a theoretical path of the motor vehicle 7 running to the right or left in the direction of travel 6 from the current location of the motor vehicle 7 with a maximum steering angle, the vehicle travel region 14 being arranged between the two trajectories 15.

FIG. 2 shows the motor vehicle 7 and the trajectories 15/1 which each start at the left-hand or right-hand lateral edge of the motor vehicle 7 and extend outward from there, the current driving speed being taken as a basis without considering a possible acceleration or deceleration, with the result that the trajectories 15/1 have a constant maximum steering angle or a constant curvature and therefore form a circle segment. In a similar manner to that explained above using the object travel region, the trajectory 15/2 may also be determined taking into account a deceleration of the motor vehicle 7, the steering angle then increasing according to the deceleration and the curvature increasing along the trajectory in the direction of travel 6.

Furthermore, the trajectories 15/1 and 15/2 may be mapped inward onto the trajectories 16/1 and 16/2 by half the width b/2 of the motor vehicle 7, with the result that they describe the movement of a center point of the motor vehicle 7.

When determining the maximum steering angle, it is possible to take into account further parameters, for example the current substrate, the weather conditions, in which case the maximum steering angle is lower when the road is wet, the contour of the route, in which case a greater deceleration is possible in the case of a rising route than in the case of a falling route, and other parameters which influence the maximum possible steering angle.

The object travel regions 9 of the individual objects and the vehicle travel region 14 are combined in the central control device 4, which is also referred to as merging. FIG. 3 shows an example of a motor vehicle 7 which travels in the direction of travel 6, a plurality of objects 5 being arranged along the route. As a result, the object travel regions 9 and the vehicle travel region 14 are each bounded by a boundary line 10, the maximum steering angle of which is determined on the basis of the current vehicle speed without concomitantly taking into account an acceleration or deceleration. The region which can be traveled on and is composed of the vehicle travel region 14 and the plurality of object travel regions 9 is bounded by a few boundary lines which can each be easily represented in mathematical terms. Inside this region, the driver assistance system can place trajectories for collision-free driving with the motor vehicle 7. In principle, it would be possible to smooth the individual boundary lines at the points of intersection of the latter by means of a continuous function having a curvature corresponding to the maximum steering angle according to the current driving speed. However, this is not necessary for practical reasons since the trajectories produced by the driver assistance system are also restricted, in terms of their curvature, to the maximum steering angle, with the result that corners of intersecting boundary lines 10 cannot be completely extended.

FIG. 4 shows a similar arrangement of objects 5 to FIG. 3, but the boundary line 10 between adjacent objects 5 is formed by rectilinear connecting lines on the left-hand side with respect to the direction of travel 6. This boundary line 10 can be created between adjacent static objects 5 with very little computational effort. In this case, the inner sides 8 of objects 5 are connected, the distance between which is less than a predetermined maximum distance. This maximum distance is, for example, 5 m to 100 m. The maximum distance may also vary on the basis of the current driving speed, and the greater the driving speed, the greater the maximum distance as well between two adjacent static objects 5 which are connected to one another using a boundary line 10. The maximum distance may also be considerably greater than 100 m at speeds of more than 100 km/h or 150 km/h, for example.

FIG. 4 illustrates a road edge 17, which may be the edge of a pavement for example, on the right-hand side in the direction of travel 6. A static object 5, which is a parked automobile for example, is on the road. In the case of such individual objects for which there is no adjacent object at a predetermined minimum distance, it makes no sense to connect the inner side 8 of this object 5 to a further inner side of another static object 5 using a straight line. In this case, as shown in FIGS. 1 and 3, the boundary line 10 is determined by a useful trajectory, with the result that a collision with the object 5 can be reliably avoided if this boundary line 10 is not crossed by the motor vehicle 7.

Connecting a plurality of objects 5 using a common boundary line 10 considerably reduces the volume of data to be transmitted since only data relating to a single boundary line need to be transmitted instead of data relating to a description of a plurality of objects.

A sensor apparatus 1 may also comprise a plurality of different sensor elements 2 which each detect the objects 5 using a different measurement principle. The individual sensor elements 2 see the different objects 5 with different intensity and it may also be the case that particular sensor elements 2 do not see particular objects and, in contrast, other sensor elements see these objects. If a plurality of objects are connected using a boundary line, this also makes it possible to connect objects which are detected using different sensor elements 2 of the sensor apparatus 1. The advantages of different sensor elements can be combined using such a boundary line.

In the exemplary embodiment shown in FIG. 4, the inner sides 8 of adjacent static objects 5 are connected using rectilinear lines in order to form the boundary line 10. Within the scope of the invention, it is also possible to use curved lines for this purpose. In particular, spline functions can be used for this purpose, with the result that the boundary line 10 forms a continuously constant line.

If the driving speed changes, the object travel region and the vehicle travel region need to be adapted in real time. The greater the driving speed, the longer also the section in front of the motor vehicle 7 in the direction of travel 6 for which the object travel region needs to be determined. The lower the driving speed, the more finely the representation of the static objects 5 can be resolved. At a low driving speed, a motor vehicle 7 can pass through a narrow gap between two adjacent static objects 5, whereas this is not possible at a high speed.

Predetermined safety distances to the boundary lines 10 of the object travel regions and of the vehicle travel region can be taken into account as safety zones or safety regions in the central control device 4 when creating an occupancy grid. As a result, accelerations and decelerations of the motor vehicle may also be allowed in a predetermined region without the occupancy grid having to be changed and without the risk of a collision with one of the objects 5. These safety zones or safety regions are not added to the sensor data in the sensor apparatus, however, since the sensor data, even if they have been preprocessed with respect to object travel regions 9, are intended to represent the reality as exactly as possible. In this case, it should be taken into account, in particular, that a plurality of different driver assistance systems which take into account different safety margins or safety zones can be used in a motor vehicle.

The exemplary embodiments explained above show different embodiments for determining the boundary line 10. There are further possible ways of determining the boundary line 10. For example, the inner sides of static objects may be extended by a predetermined amount in the direction of travel. This produces sections of the boundary line 10. The length of these sections is preferably set on the basis of the driving speed, in which case, the higher the driving speed, the longer these sections are. The individual sections must not result in a continuous boundary line. The representation of the boundary line by means of a plurality of such sections is expedient, in particular, at high speeds at which no severe steering locks are possible in principle. Such rectilinear sections can be transmitted, with few data items, from the sensor apparatuses to the central control device.

Furthermore, it is possible to carry out automatic object recognition which is used to automatically recognize, for example, road boundary posts and road signs which constitute static objects. Since road boundary posts and road signs are arranged at the edge of the road, they can be connected to one another, in principle, in order to form the boundary line 10.

Within the scope of the invention, sensor data acquired by means of a sensor apparatus can be processed for a comfort driver assistance system, sensor data describing objects being preprocessed in such a manner that a distinction is made between a region which can be traveled on and a region which cannot be traveled on, the region which can be traveled on being referred to as an object travel region. The object travel region can be bounded by a boundary line. Since the sensor data are processed for a comfort driver assistance system, they need not describe the entire region which can be theoretically traveled on, but rather it suffices if the boundary line bounds the region which can usually be usefully traveled on. This makes it possible, on the one hand, to very easily determine a corresponding boundary line and, on the other hand, to considerably reduce the volume of data which needs to be transmitted from the sensor apparatus to a central control device of the comfort driver assistance system in order to describe the detected objects.

LIST OF REFERENCE SYMBOLS

1 Sensor apparatus
2 Sensor element
3 Processor controller
4 Central control device
5 Object
6 Direction of travel
7 Vehicle
8 Inner side of an object
9 Object travel region
10 Boundary line
11 Trajectory
12 Lateral edge of the driver's own vehicle
13 Trajectory 14 Vehicle travel region
15 Trajectory
16 Trajectory
17 Edge of the road
b Width The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing sensor data for a comfort driver assistance system for a motor vehicle, in which sensor data describing respective locations of a plurality of objects are acquired, the method comprising the acts of:
    extracting coordinates of the plurality of objects from the sensor data, wherein an inner side of an object of the plurality of objects, on which the motor vehicle is intended to drive past the object, is determined;
    distinguishing a region which can be traveled on and is in front of and/or behind each of the plurality of objects in a direction of travel of the motor vehicle from a region which cannot be traveled on, wherein the region which can be traveled on is an object travel region and wherein a boundary between the object travel region and the region which cannot be traveled on is a boundary line which extends beyond the object to a front and/or to a rear along the inner side of the object in the direction of travel; and
    determining the boundary line and forwarding data relating to the boundary line from a sensor device to a central control device of the comfort driver assistance system instead of the sensor data describing the object, wherein the boundary line is a trajectory which describes a path of the motor vehicle which, coming from an outer side in front of the object in the direction of travel, leads past the inner side of the object at a minimum distance with a maximum steering angle, and/or describes a path which leads outward from the object with a maximum steering angle for a current driving speed after the object, the maximum steering angle being determined based on a speed of the motor vehicle.

2. The method as claimed in claim 1, wherein determining the boundary line comprises connecting inner sides of adjacent ones of the plurality of objects.

3. The method as claimed in claim 2, wherein the plurality of objects are detected by a plurality of different sensor elements.

4. The method as claimed in claim 1, wherein the boundary line is determined only if the vehicle is moving at a predetermined minimum speed.

5. The method as claimed in claim 1, wherein inner sides of the plurality of objects are determined as a respective side of the plurality of objects which is passed by a trajectory of the motor vehicle which is extended in the direction of travel.

6. The method as claimed in claim 1, further comprising performing automatic object recognition, wherein each of the plurality of objects is respectively assigned to a class of a predetermined set of classes of objects.

7. The method as claimed in claim 6, wherein performing automatic object recognition comprises performing automatic object recognition using an image analysis.

8. The method as claimed in claim 1, further comprising detecting moving objects, wherein the moving objects are detected by a speed measurement corresponding to a relative speed between the motor vehicle and the object.

9. The method as claimed in claim 8, wherein said moving objects are not taken into account as obstacles which restrict the region which can be traveled on when determining the region which can be traveled on.

10. The method as claimed in claim 8, wherein said moving objects are taken into account when determining inner sides of static objects.

11. The method as claimed in claim 1, further comprising determining a vehicle travel region and boundary lines of which are defined by two trajectories each describing a theoretical path of the motor vehicle running to a right or a left in the direction of travel from the current location of the motor vehicle with a maximum steering angle, wherein the vehicle travel region is between the two trajectories, and wherein objects and an object travel region outside the vehicle travel region are ignored.

12. The method as claimed in claim 11, wherein the vehicle travel region is calculated in the central control device and is combined with the object travel region to form a movement region.

13. The method as claimed in claim 1, wherein a plurality of sensor apparatuses each calculate object travel regions that are forwarded to the central control device.

14. A sensor apparatus comprising:
    a sensor element configured to acquire sensor data describing locations of a plurality of objects; and
    a processor controller coupled to the sensor element, wherein the processor controller is configured to:
        process sensor data received from the sensor element for a comfort driver assistance system for a motor vehicle,
        extract coordinates of the plurality of objects from the sensor data, wherein an inner side of an object of the plurality of objects, on which the motor vehicle is intended to drive past the object is defined,
        distinguish a region which can be traveled on and is in front of and/or behind each of the plurality of objects in a direction of travel from a region which cannot be traveled on, wherein the region which can be traveled on is an object travel region, wherein a boundary between the object travel region and the region which cannot be traveled on is a boundary line which extends beyond the object to a front and/or to a rear along the inner side of the object in the direction of travel, and
        determine the boundary line and forwarding data relating to the boundary line from a sensor device to a central control device of the comfort driver assistance system instead of the sensor data describing the object, wherein the boundary line is a trajectory which describes a path of the motor vehicle which, coming from an outer side in front of the object in the direction of travel, leads past the inner side of the object at a minimum distance with a maximum steering angle, and/or describes a path which leads outward from the object with a maximum steering angle for a current driving speed after the object, the maximum steering angle being determined based on a speed of the motor vehicle.

15. The sensor apparatus as claimed in claim 14, wherein the sensor element is at least one of a radar, a lidar, a camera, an ultrasonic sensor and a digital map.

16. The sensor apparatus as claimed in claim 14, wherein the sensor apparatus has at least two different sensor elements.

17. A system for processing sensor data for a comfort driver assistance system for a motor vehicle, comprising:
   at least one sensor apparatus as claimed in claim 14; and
   a central control device which is connected to the sensor apparatus, wherein the central control device is configured to create an occupancy grid.

* * * * *